United States Patent [19]

Olecko

[11] Patent Number: 4,920,690

[45] Date of Patent: May 1, 1990

[54] CABLE TRAP

[76] Inventor: Ray Olecko, 28 MacAuley Place, Winnipeg, Manitoba, Canada, R2G 0P8

[21] Appl. No.: 403,199

[22] Filed: Sep. 5, 1989

[30] Foreign Application Priority Data

Jul. 7, 1986 [CA] Canada ................................ 499159

[51] Int. Cl.⁵ ............................................. A01M 23/34
[52] U.S. Cl. ....................................................... 43/87
[58] Field of Search ................................. 43/87, 88, 89

[56] References Cited

U.S. PATENT DOCUMENTS

| | | |
|---|---|---|
| 3,060,623 | 10/1962 | Aldrich ..................................... 43/87 |
| 4,005,542 | 2/1977 | Anderson . |
| 4,171,589 | 10/1979 | Brownlie . |
| 4,267,660 | 5/1981 | Kielhorn . |
| 4,581,843 | 4/1986 | Fremont et al. ......................... 43/87 |
| 4,757,639 | 7/1988 | Bertram ................................... 43/87 |

FOREIGN PATENT DOCUMENTS

| | | |
|---|---|---|
| 941614 | 2/1974 | Canada . |
| 1117759 | 2/1982 | Canada . |
| 1120717 | 3/1982 | Canada . |
| 2063042 | 6/1981 | United Kingdom . |

*Primary Examiner*—M. Jordan
*Attorney, Agent, or Firm*—Jacobson & Johnson

[57] ABSTRACT

A hairpin spring type trap includes a pair of arms normally urged apart by the spring situated at the inner ends thereof. A cable loop is secured by one end to the distal end of one arm and passes through a guide loop in the distal end of the other arm and is secured to a bracket or clip slidable along the arm through which said loop passes. Ths bracket is frictionally adjustable along the length of the arm when the trap is in the set position. A trigger is pivoted on the other arm and a setting plate extends from the one arm towards the other arm. This plate is provided with opposed jaws on the distal end thereof. When set, the bale of the trigger engages one jaw and the lower arm engages the other jaw with the spring pressure retaining the trap in the set position. Pivotal movement of the trigger in either direction release the trap. If the trigger is swung upwardly against the one arm, the trap is held in a safety position. A retainer may be secured to a supporting surface such as a tree or a deadfall and the coil spring engages over a hub on the retainer when the trap is set thus supporting the trap substantially horizontally.

20 Claims, 10 Drawing Sheets

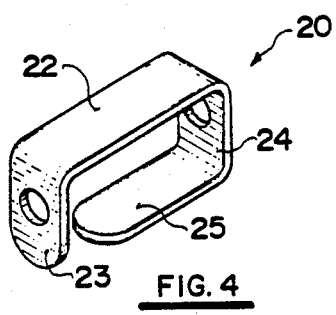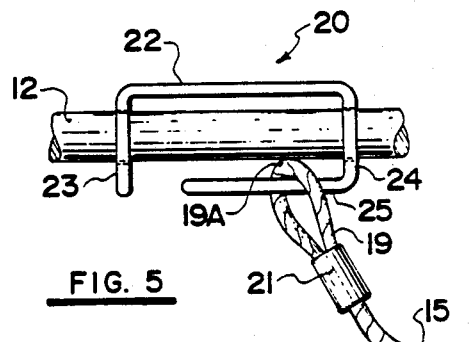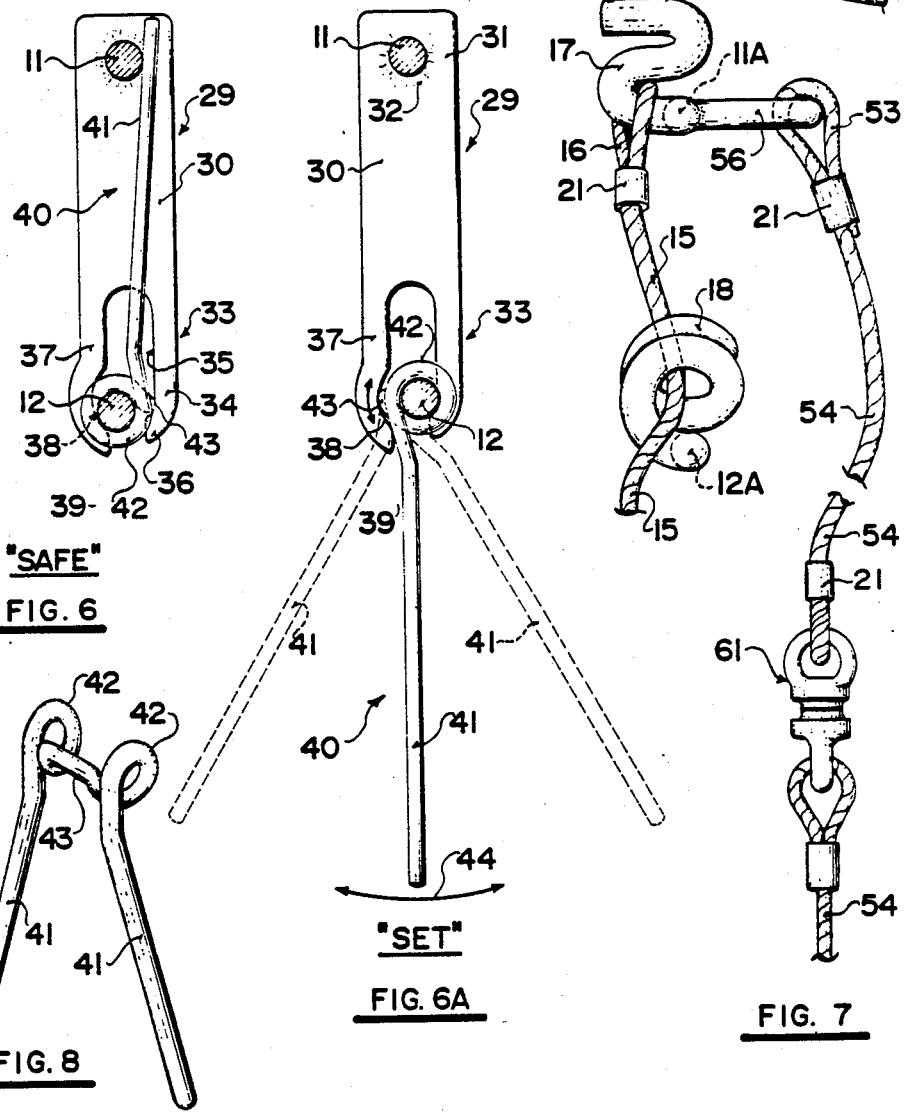

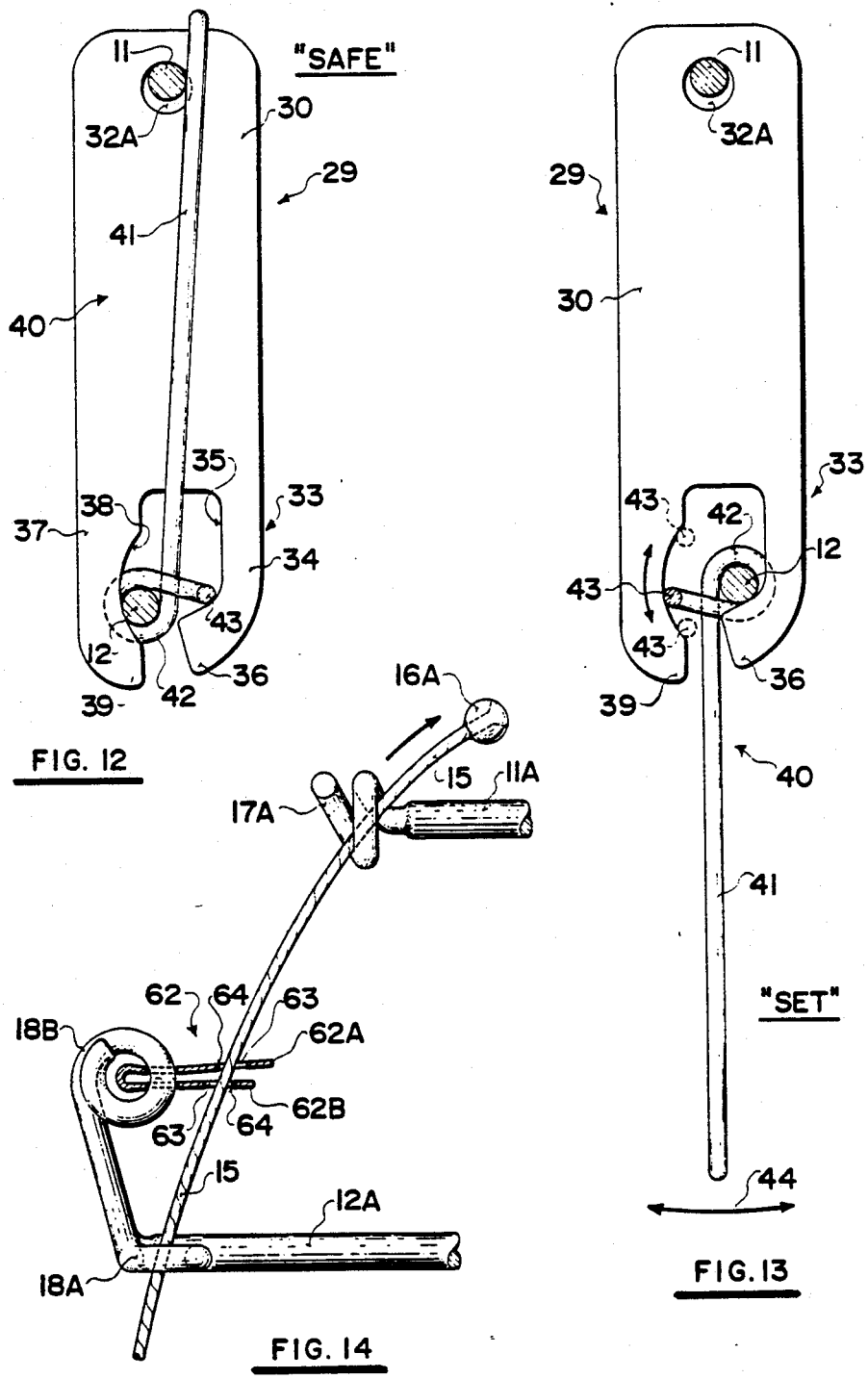

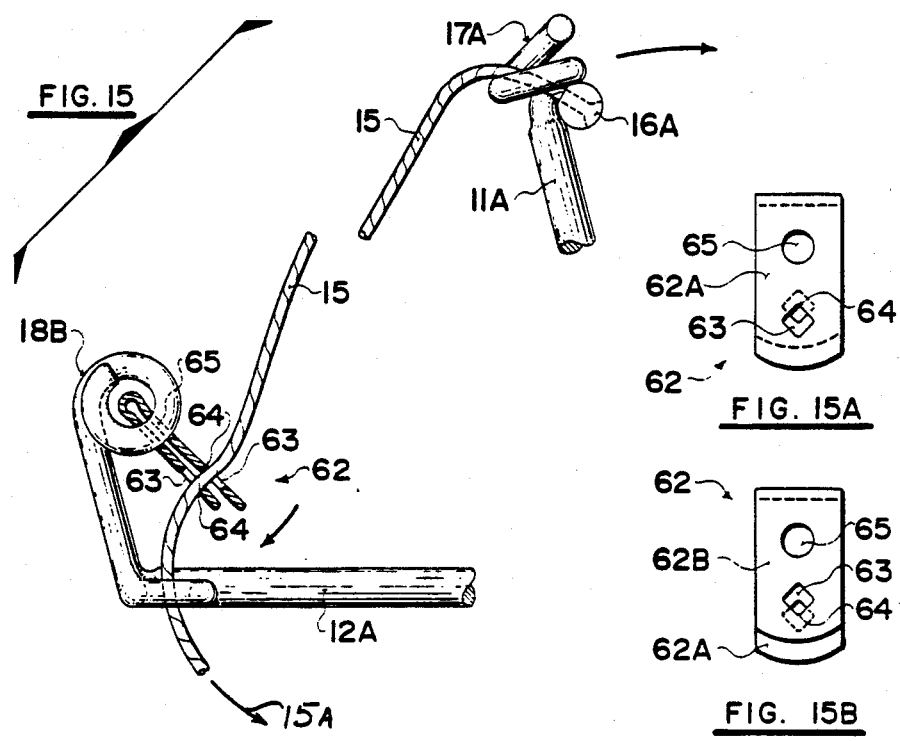
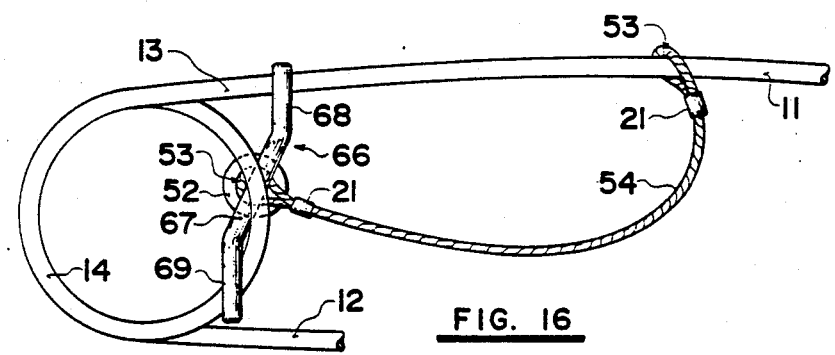
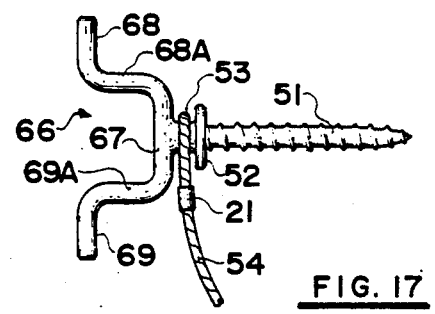

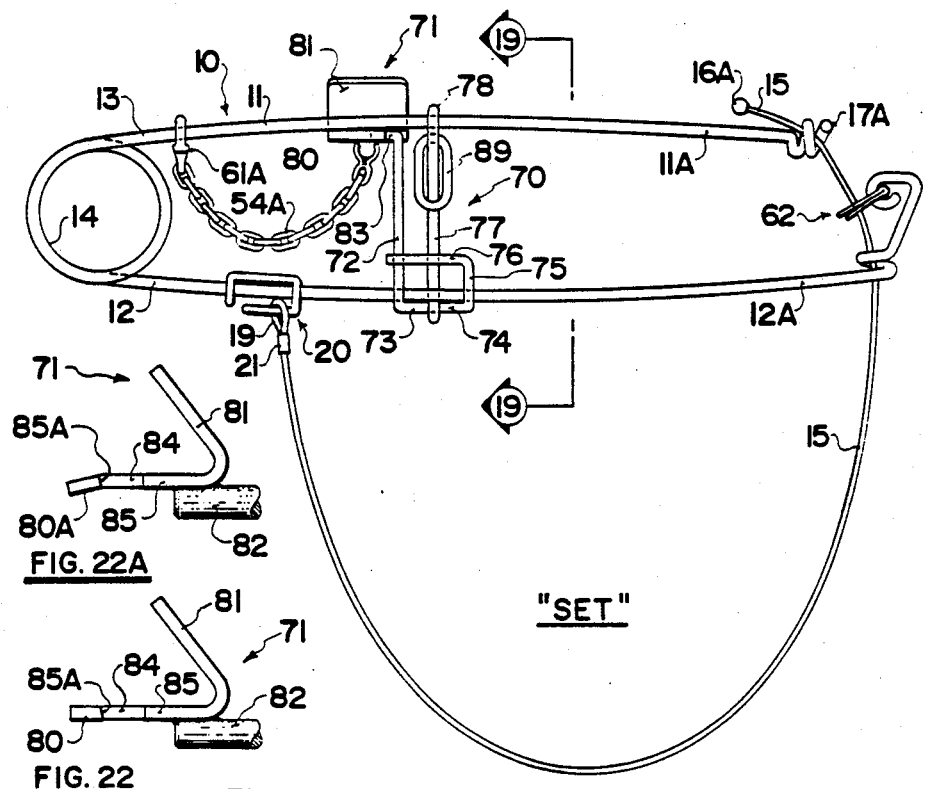
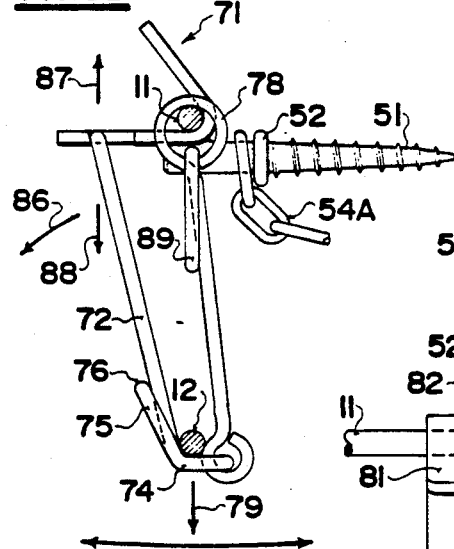
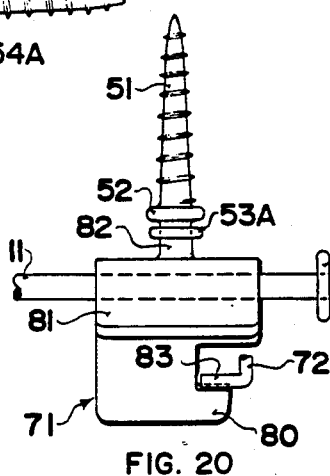
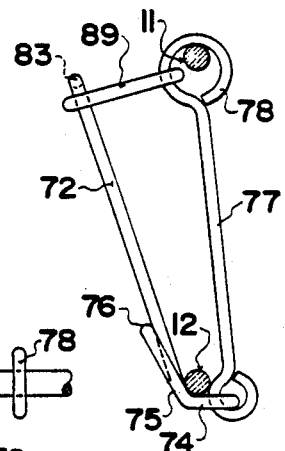

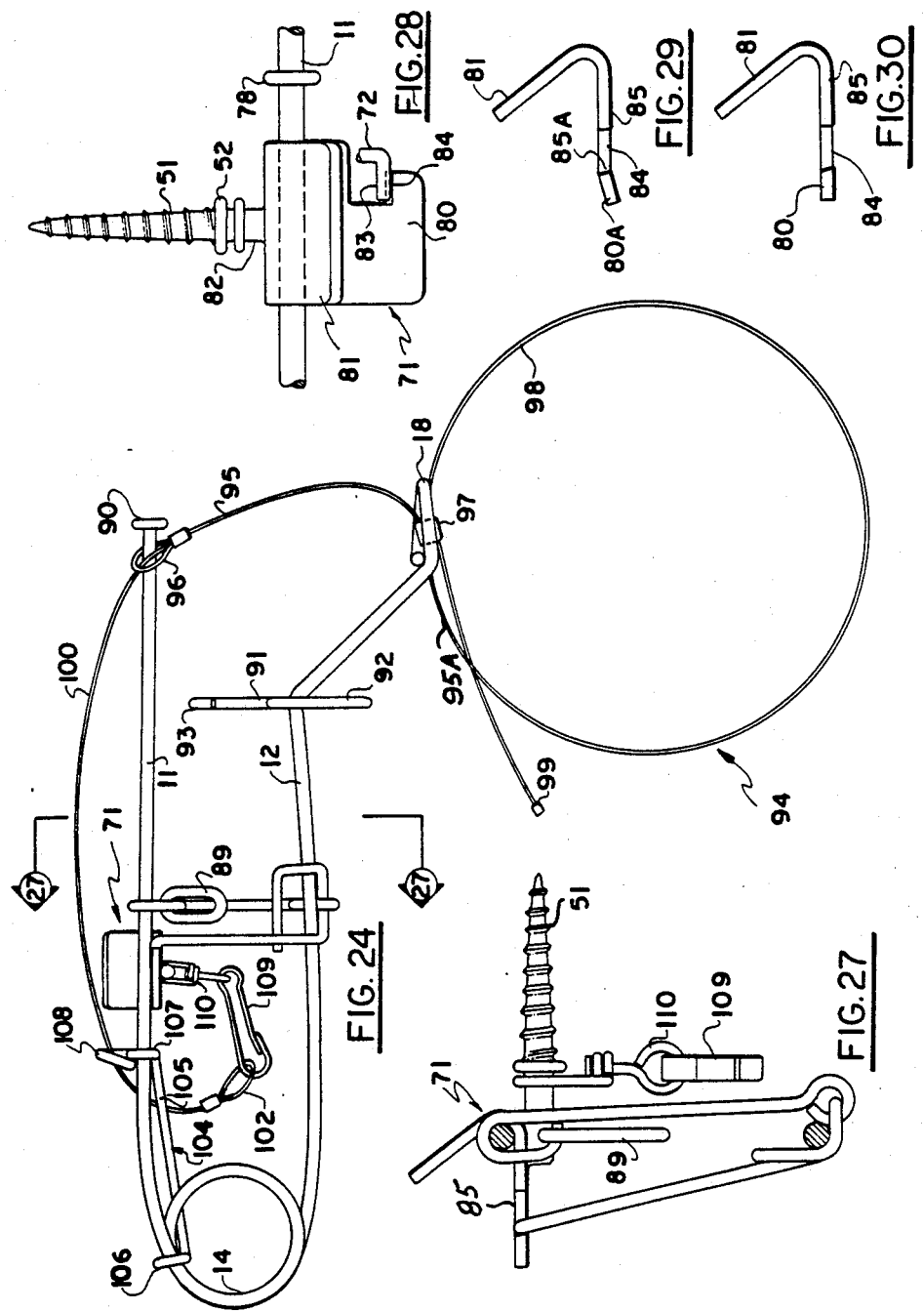

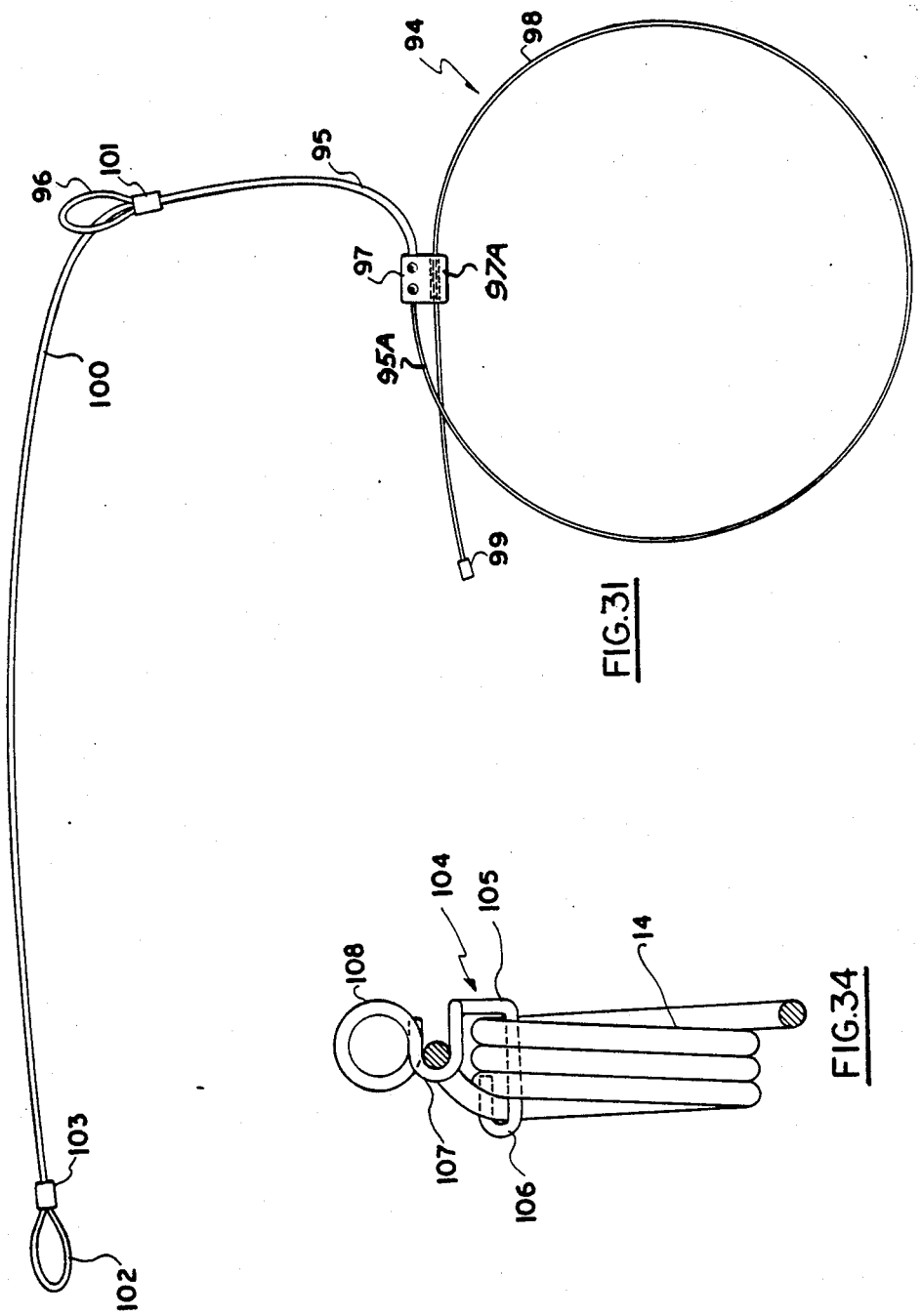

4,920,690

CABLE TRAP

BACKGROUND OF THE INVENTION

This invention relates to new and useful animal traps, particularly traps conventionally comprising a pair of arms resiliently connected together by a coil spring at one end thereof. These traps include a trigger mechanism normally holding the arms in the set, close together, position with the spring pressing them apart violently when the trigger is released. Alternatively the two arms may be pivoted together with a spring provided at the pivot point and operatively connected to the arms once again normally urging them apart from one another at the distal ends thereof.

Such traps normally utilize a flexible cable comprising a loop with one end being secured adjacent the distal end of one of the arms and the standing part of the loop being connected to the distal end of the other arm so that when the trap is sprung, the distal ends of the arms move apart rapidly thus closing the loop around the animal which has activated the trigger mechanism. The trigger mechanism of this type of trap normally extends from the distal end of the arms as does the loop.

Such traps are difficult to support and set so that they operate efficiently inasmuch as they only rely on the choking affect of the loops to kill the animal trapped thereby.

They are difficult to support in a position whereby, for example, small animals will not activate the trap and only the larger animal desired will activate the trap.

Other disadvantages include difficulties in anchoring the traps, difficulties in actuation thereof by animals travelling in either direction relative to the noose and relatively involved operating parts all of which lead to uncertainty of operation. Furthermore the trigger mechanisms of such traps are usually relatively stiff to operate due to the extensive spring pressure required particularly as the provision of sufficient leverage is often difficult if not impossible to provide.

SUMMARY OF THE INVENTION

The present invention overcomes these disadvantages by the provision of a relatively simple cable trap activated by spring loaded arms which normally move apart violently when the trigger mechanism is activated. By contrast to existing traps, the cable loop is secured by one end thereof to the distal end of the upper arm, passes freely through a guide on the distal end of the lower arm, and is secured to a slider bracket slidable along the length of the lower arm so that the loop is defined between the slider bracket, the distal end of the lower arm and the upper arm itself.

In accordance with the invention there is provided an animal trap comprising in combination a pair of elongated arms movable from a set position to a sprung or released position and vice versa, means at one end of said arms connecting same together and including spring means normally urging the distal ends of said arms away from one another, a flexible cable being connected by one end thereof, for sliding movement, along the length of one of said arms, a trapping loop on the other end of said cable, means on the distal end of the other of said arms slidably receiving said trapping loop of said cable and freely guiding same, cable pivot means on said one arm adjacent said spring means, trap retainer means for detachably supporting said trap by said one arm thereof, a flexible link extending from said one end of said flexible cable, freely passing through said cable pivot means and being secured to said trap retainer means, and trigger means operatively extending between said arms when in the set position, said one end of said cable means sliding along said one arm away from said one end thereof, when said trap is sprung thereby rapidly pulling said trapping loop through said means on the distal end of the other of said arms and decreasing the size of said sliding loop as the distal ends of said arms are moved apart by said spring means.

A further advantage of the present invention is to provide a device of the character herewithin described which includes a trigger mechanism allowing the trap to be placed in a set position and released by movement of the trigger mechanism in either direction or, alternatively, the trigger mechanism may be pivoted to detachably lock the trap in a safety position thus preventing undesirable release thereof. The safety position is used during the setting of the trap, after which the trigger is set to the "live" position.

Yet another advantage of the present invention is to provide a device of the character herewithin described which permits the trap to be supported in a substantially horizontal position and detachably secured to a tree or a log thereby permitting the loop to be set with the lower run thereof well above the ground so that smaller animals may pass beneath the trap and not release same.

Yet another advantage of the invention is that it is a humane trap inasmuch as it is designed to kill quickly due to the mechanical leverage provided by the design of the cable attachment to the spring loaded arms.

Still another advantage of the invention is to provide a device of the character herewithin described which simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the preferred typical embodiment of the principles of the present invention which:

DESCRIPTION OF THE DRAWINGS

FIG. 3 is a side elevation of the trap in the safety position.

FIG. 4 is an enlarged isometric view of the cable loop anchor clip or bracket.

FIG. 5 is a side elevation of the bracket of FIG. 4 installed upon the lower arm shown in fragmentary form.

FIG. 6 is an end elevation of the trigger mechanism per se in the safety position substantially along the line 6—6 of 3.

FIG. 6A is a view similar to FIG. 6 but showing the trigger mechanism in the set position and showing the mechanism substantially along the line 6A—6A of FIG. 1.

FIG. 7 is a fragmentary end elevation of the trap with the coil removed showing the run of the cable loop and of the anchor cable.

FIG. 8 is an isometric view of the trigger element per se.

FIG. 9 is a fragmentary cross sectional view of the coil spring portion of the trap engaged with the retainer, the section being taken substantially along the line 9—9 of FIG. 1.

FIG. 10 is a side elevation taken from the left hand side of FIG. 9.

FIG. 12 is a view similar to FIG. 6 showing, in enlarged scale, an embodiment designed for use with other traps.

FIG. 13 is a view of FIG. 12 but similar to FIG. 6A showing the in the "set" position.

FIG. 14 is a fragmentary side elevation of the distal ends of the trap showing the detachable lock means for the cable.

FIG. 15 is a view similar to FIG. 14, but showing the lock mechanism when the trap is sprung.

FIG. 15A is a view of the locking clip taken from the upper side relative to FIG. 15.

FIG. 15B is a view similar to FIG. 15A but taken from the underside relative to FIG. 15.

FIG. 16 is a fragmentary side elevation of the inner end of the trap showing the an embodiment of the retainer in position.

FIG. 17 is a side elevation of the retainer per se.

FIG. 18 is a view similar to FIG. 1, but showing a further embodiment.

FIG. 19 is a cross sectional view substantially along the line 19—19 of FIG. 18.

FIG. 20 is a fragmentary top plan view of the trap retainer component.

FIG. 21 is a view similar to FIG. 19 but with the trap in the "safe" position.

FIG. 22 is an end elevation of the trap retainer per se.

FIG. 22A is an improved version of the retainer shown in 22.

FIG. 24 is a view similar to FIG. 23 but with the cable assembly included and shown in the "set" position.

FIG. 27 is a cross sectional view along the line 27—27 of FIG. 24.

FIG. 28 is a top plan view of the trap retainer similar to FIG. 20.

FIG. 29 is an end view of the preferred embodiment of the retainer bracket per se, similar to FIG. 22A.

FIG. 30 is a view similar to FIG. 29 but showing an alternative similar to FIG. 22.

FIG. 31 is a side elevation of the cable assembly per se.

FIG. 34 is a cross sectional view substantially along the line 34—34 of FIG. 23.

In the drawings like characters of reference indicate corresponding parts in the different figures.

DETAILED DESCRIPTION

Figure 2:
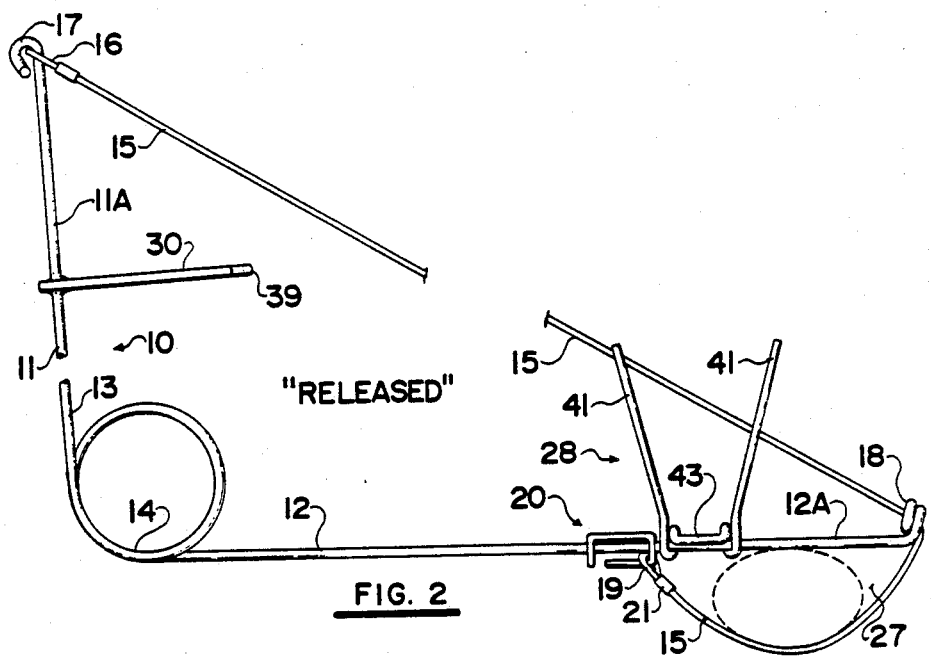
FIG. 2 is a side elevation of the trap in the released position.

Proceeding therefore to describe the invention in detail, reference should first be made to the embodiment shown in FIGS. 2 and 3 in which reference character 10 illustrates the spring arm component which, when in the position illustrated, comprises an upper arm 11 and a lower arm 12 connected together by the inner ends 13 thereof by means of one or more coil type hairpin springs 14. In this embodiment, the arms are formed integrally with the coil spring and extend one from each end thereof as clearly shown. Alternatively, the two arms may be pivoted together and a spring operatively connected to the pivot, engaging the two arms. This embodiment is not illustrated but in both cases, the spring (in this embodiment) acts to urge the distal ends 11A and 12A apart from one another when the trap is in the released position illustrated in FIG. 2. In the claims appended hereto, the upper arm 11 is defined as one arm and the lower arm 12, as the other arm.

A flexible cable loop 15 is provided with an attaching loop 16 being formed on one end thereof engageable within an eye 17 formed in the distal end 11A of the upper arm 11.

It will be noted that the lower or other arm 12 is slightly longer than the arm 11 and is provided with an eye 18 on the end thereof through which the length of the cable 15 freely passes. The additional length of arm 12 assists in providing easy running of the cable 15 through this eye 18 when the arms are moved apart to the released position as shown in FIG. 2.

Anchor means are provided for the other end of the cable loop 15 which is also provided with a closed loop 19 thereon, said anchor means taking the form of a slider bracket collectively designated 20.

Both of the loops 16 and 19 are formed in the cable by means of turning back the end and clamping same to the standing part by means of pressure clamps 21 as is conventional.

The slider bracket 20 is shown in detail in FIGS. 4 and 5 and includes a horizontal upper portion 22 having a down turned apertured one end 23 and a downturned apertured other end 24 with the end 24 being angulated towards the end 23 to provide a lower portion 25 spaced and parallel from the upper portion 22.

The lower arm 12 which is cylindrical in cross section, is slidably engaged through the apertures in the ends 23 and 24 so that the slider bracket may slide freely along the length of arm 12 as will hereinafter be described.

The loop 19 of the cable 15 engages over the lower portion 25 and the dimensions of the slider bracket are such that the upper portion 19A of the loop 19 is frictionally engaged between the underside of the arm 12 and upper side of the lower portion 25 of the slider bracket 20. This frictional engagement is such that the bracket may slide along the length of arm 12 readily but is retained in the desired location by the frictional engagement of the loop 19 between the arm and the bracket.

The bracket moves in the direction of double headed arrow 26 and permits the bracket to be positioned to avoid interference from trees, twigs, bushes and the like.

Trigger means are provided collectively designated 28 and in this regard, reference should be made to FIGS. 6, 6A and 8 together with FIGS. 12 and 13 which illustrate the trigger assembly which may be used with other traps.

A trigger engaging member collectively designated 29 consists of an elongated plate 30 engaged by the upper end 31 thereof over the upper arm 11 and welded or otherwise secured in position as indicated by reference character 32, intermediate the ends of the arm 11 but substantially towards the distal end 11A thereof. Alternatively, this plate 30 may be slideable on the upper arm 11 as shown in FIGS. 12 and 13. This trigger engaging member or plate extends from the arm 11 towards the arm 12 and is provided with a pair of opposed jaws collectively designated 33 on the other or distal end thereof. The first jaw 34 is provided with a straight inner surface 35 and an inturned end 36. The second jaw 37 is provided with an arcuately curved (arc of a circle) inner surface 38 terminating in an inturned end 39 and it will be observed that the end 36 of the first jaw is situated above but spaced from the inturned end 39 of the second jaw.

A trigger element is provided collectively designated 40 and shown in detail in FIG. 8.

It includes a pair of spaced diverging legs 41 with an eye 42 formed at the upper end thereof with the two eyes being in spaced apart relationship and connected by means of a bale portion 43 situated spaced from the plane of the legs 41. The eyes 42 freely engage over the lower arm 12 so that the element may pivot in either direction as indicated by double headed arrow 44 in FIG. 6A and may also slide along the length of arm 12 as will hereinafter be described.

When in the set position, the element is moved so that the eyes 42 are situated one upon each side of the plate 30 with the arm 12 registering within the first jaw 34 and the bale registering within the arcuately curved surface 38 of the second jaw 37 and the legs 41 depending substantially downwardly as clearly shown in solid line in FIG. 6A.

The pressure of spring 14 which is endeavouring to urge the arms 11 and 12 apart, forces the arm 12 against jaw 34 and the bale against jaw 37.

If the legs 41 are moved to the left with regard to FIG. 6A, the bale 43 moves up within the arcuately curved inner surface 38 thereby ramping the arm 12 downwardly and clear of the lower inturned end 36 of the member 30 thus releasing the trap and allowing the spring 14 to force the arms apart with considerable speed.

The majority of the force of the spring 14 is between arm 12 and the flat inner surface of the jaw 34 thereby allowing easy rotation of the bale against surface 38 of jaw 37.

If, alternatively, the legs 42 are moved to the right with respect to FIG. 6A, then the bale 43 moves downwardly along the arcuately curved surface 38 until it disengages from the lower end 39 of the second jaw 37 once again releasing the trap and allowing the spring 14 to force the arms apart. In either case it will be noted that considerable movement is permitted in either direction, of the bale 41 and the leverage characteristics of the trigger element and the jaws 34 and 37 are such that the bale moves relatively easily in either direction thus making actuation of the trap extremely simple and effective.

When the trap releases, the arms move apart towards the position shown in FIG. 2. This pulls the cable 15 through the eye 18 as the eye 17 moves apart and at the same time this slides the slider bracket 20 along the arm 12 towards the distal end 12A thereof. As it engages the now released trigger element 40, it also is carried towards the distal end 12A and will strike the back of the neck of the animal engaged through the cable loop, a relatively severe blow as the cable loop tightens around the throat thereof. Compound leverage is created by the arm 12A and the cable 15 attached to the slider bracket, applying much more pressure to the animal than just the power in the spring thus ensuring a humane kill.

The violence of the blow and the constriction of the loop are of course controlled by the strength of the spring 14.

The trigger mechanism is also used to hold the trap in a safety position during the setting of the trap. To accomplish this, the trap is moved to the set position of FIG. 1 whereupon the trigger element 40 is rotated through approximately 180° so that the legs 42 lie against the side of the upper arm 11, one upon each side of the trigger engaging member 30 as shown in FIGS. 3, 6 and 12.

Due to the rotation of the trigger element, through 180°, it will be noted that the member 12 now engages the arcuately curved surface 38 of the second leg and that the bale portion 43 now engages within the curved surface 35 of the first leg 34. Under these conditions, it is impossible to release the trap unless and until the position of the trigger element is reversed to the original position.

FIGS. 12 and 13 show the embodiment in which the plate 30 is free to slide on the upper member 11 and is particularly suitable for use with other spring type traps.

Figure 11:
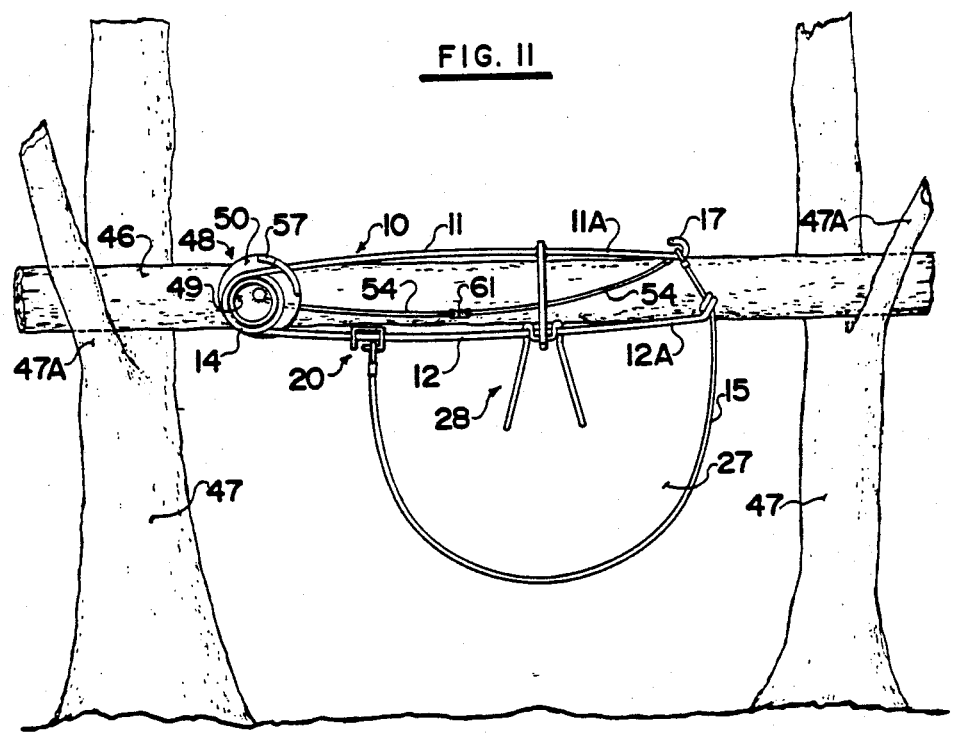
FIG. 11 is a view of the trap in the set position and retained upon a horizontal deadfall by the retainer of FIGS. 9 and 10.
Figure 23:
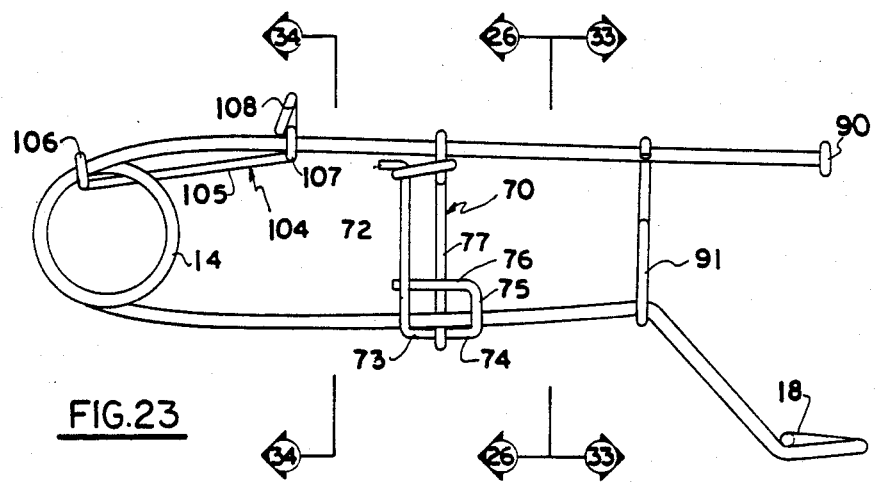
FIG. 23 is a side elevation of the preferred embodiment of the trap assembly with the cable assembly removed for clarity.

FIGS. 9, 10 and 11 show a method of detachably supporting the trap in position either upon a vertically situated tree trunk or, a deadfall or log which may be supported in a horizontal relationship spaced above the ground surface indicated in FIG. 11 by reference character 45. In this view, the deadfall 46 is supported within forks formed by branches 47A extending from tree trunks 47.

FIGS. 9 and 10 show the retainer assembly collectively designated 48. It consists of a substantially cylindrical hub 49 extending perpendicularly from an end plate 50. A screw threaded pin or bolt 51 extends from the other side of the end plate 50 and may be screw threadably engaged within the tree or deadfall, by rotation. A washer 52 is secured to the shank of the bolt 51 spaced from the end plate 50 and a looped portion 53 of a flexible anchor cable 54 is engaged around the shank between the end plate and the washer 52.

The other end of the anchor cable 54 is also provided with an eye or loop 55 engaged within an off-standing eye 56 formed on the distal end of the arm 11 of the trap and this is shown in FIGS. 7 and 11.

The end plate is preferably provided with peripheral edges 50A which are curved (not illustrated) towards the hub 49 thus presenting a slightly convex surface to the loop 53 in the cable 54 to reduce an tendency of the cable to snag on the edges of the end plate.

A slotted support plate collectively designated 57 is arcuately curved and extends from the end plate 50 on the side of the hub 49 and spaced therefrom as clearly shown in FIG. 10 and this support plate is provided with a downwardly and inwardly curved slot 58 having an open upper end 59 and a closed base 60.

In operation, the retainer is engaged within the supporting surface such as the deadfall 46 whereupon the coils of the spring 14 are engaged over the hub 49 and the upper arm 11 of the trap is engaged within the upper end 59 of the slot 58 and lowered to the position illustrated in FIG. 9 whereupon it engages the lower end 60 of the slot thus supporting the trap with the arm 11 and 12 lying substantially horizontally along the support 46 in a cantilever fashion. The lower arm 12 lies against the inner surface of the plate 50 below the hub 49.

Under these circumstances, the trap is in the set position with the cable loop 27 situated below the support 46 and spaced above the ground as shown in FIG. 11 so that animals of a relatively small size will pass below the loop 27 and which will only be effective against relatively large animals.

As mentioned previously, the trigger element 40 will be operated by an animal passing in either direction as soon as the animal's entire head and neck enters the loop 27 whereupon the trap will be released stunning and strangling the animal and at the same time the violent release of the trap will disengage it from the slotted support plate 57 assisted by the ramping or camming action of arm 11 riding up and out of slot 58 which forces the coil spring portion 14 from the hub 49. The arms extend freely to the released position shown in FIG. 2 and is secured to the retainer only by the flexible anchor cable 54 thus giving a relatively straight line pull if the animal attempts to escape, which action intensifies the effect of the cable loop 27. It is preferable that a swivel of 61 be provided along the length of the anchor cable 54.

Figure 1:
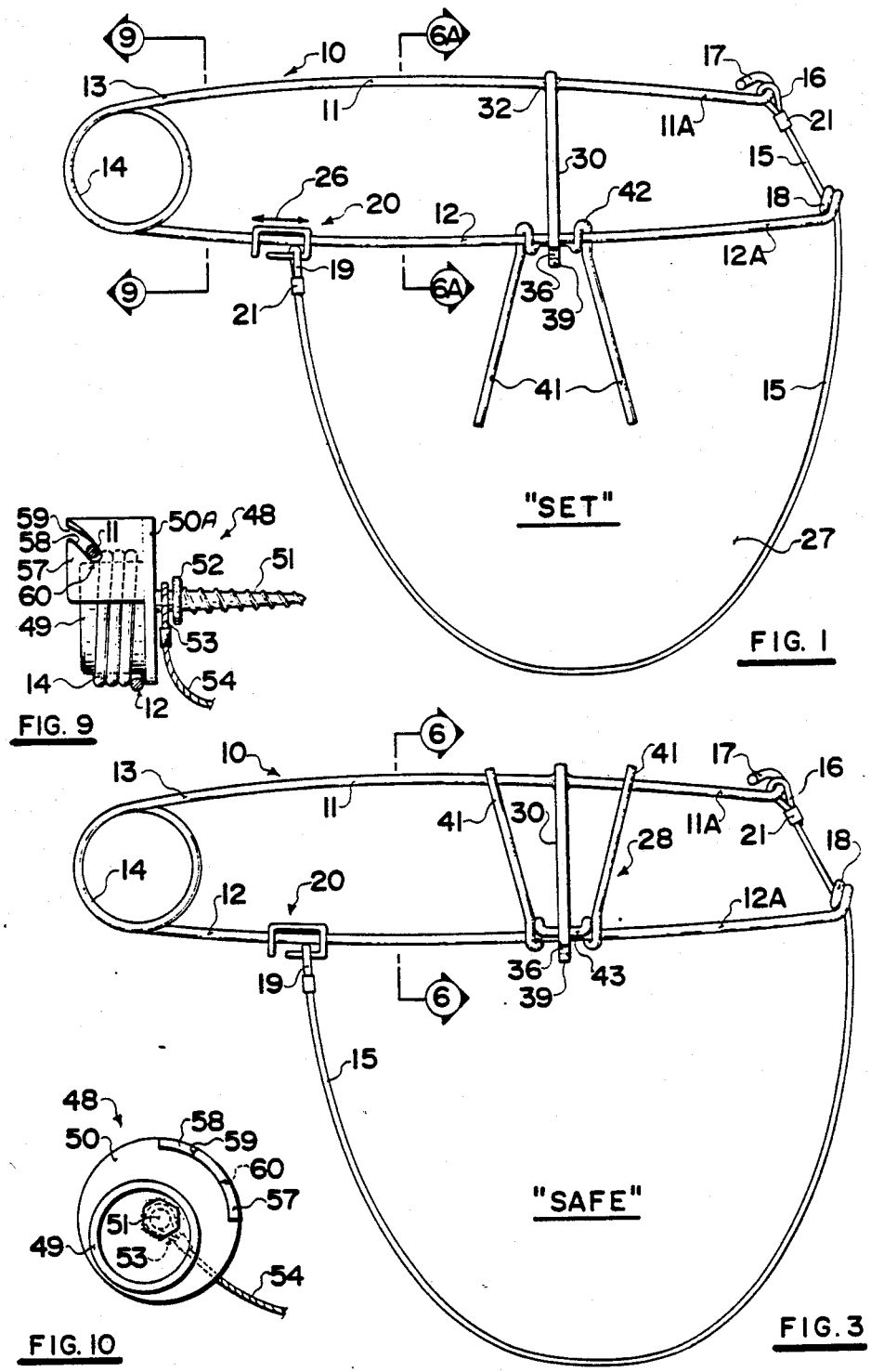
FIG. 1 is a side elevation one embodiment of the trap in the set position.

It will be observed that release of the trap from the retainer is facilitated by the fact that as the legs spread apart from the position in FIG. 1 to the position in FIG. 2, the diameter of the coils 14 increases thus freeing it from the hub 49 and assisting in the detachment.

As mentioned previously, FIGS. 12 and 13 show a further embodiment of the trigger mechanism in which plate 30 is freely slidable along rod 11 so that the trigger mechanism can readily be adapted for use with other spring type traps.

FIGS. 14, 15, 15A and 15B show mechanism which prevents the cable from being pulled loose once the trap moves to the sprung position.

This mechanism which is collectively designated 62 is a resilient spring clip consisting of a flat piece of resilient metal counter-angulated to form two substantially spaced and parallel plates or legs 62A and 62B which are apertured as at 63 so that the apertures are slightly staggered one from the other. This clip is also apertured adjacent the angulated inner end and engages a portion 18B and can pivot upwardly and downwardly in the direction of the run of the cable as clearly shown. When in the set position shown in FIG. 14, the cable runs through the staggered apertures 63 freely as shown and as the trap releases, arm 11A will draw the cable through loop 18A and through the apertures 63 without any restriction with the clip engaging the portion 18B through the aperture 65 and into the position illustrated in FIG. 14.

However, once the trap has sprung to the position shown in FIG. 15, any attempt to pull the cable back through the eye 18A in the direction of arrow 15A, will cause the clip to move downwardly to the position shown in FIG. 15 so that the inner corner 64 of the upper leg and the outer corner 64 of the lower leg, cause the cable to kink slightly as clearly shown thus preventing movement of the cable through the clip. These apertures 63 are preferably of square configuration with the points 64 constituting the junction between adjacent ides. FIGS. 15A and 15B show the interference of these two apertures when in the position illustrated in FIG. 15. Needless to say, when the operator wishes to release the cable, the clip is moved manually to the position shown in FIG. 14 thus allowing free run of the cable through the apertures 64.

FIGS. 16 and 17 show a further embodiment of the retainer collectively designated 66. It consists of the screw threaded shank 51 with washer 52 and the loop of the cable 54 engaging between the washer and the retainer body portion. The body portion consists of the cross piece 67 to which the screw threaded shank 51 is secured, right angulated portions 68A and 69A extending from each end of the cross piece 67 and further angulated portions 68 and 69 which are bent outwardly so that they lie parallel with the cross piece 67. The portions 68 and 69 are staggered with relation to one another when viewed in end elevation as clearly shown in FIG. 16 with the portion 69 extending over one side of the spring loop 14, the cross piece engaging behind the loop and the portion 68 engaging in front of the upper arm 11. This supports the trap in the position shown in FIG. 11 and when the trap is srung, the movement of the arms away from one another release the trap from the retainer in a manner similar to that hereinbefore described for the other embodiment.

FIGS. 18 through 22A illustrate an embodiment of the trap in which the operation of the upper and lower arms and the flexible cable loop 15 are similar to that described in the previous embodiments so that similar reference characters have been given.

However, in this embodiment, an improved trigger assembly 70 has been provided together with an improved trap retainer collectively designated 71.

The trigger assembly is shown in detail in the drawings and consists of a trigger lever 72 which is pivoted to the lower or other arm 12 and is slidable therealong. This pivotal connection consists of a first leg 73 angulating rearwardly from the lower end of the trigger lever 72 and then angulating forwardly as at 74 to form a triangular or bifurcated leg portion. The outer end of leg 74 then angulates upwardly as at 75 and then horizontally across towards the lever 72 as indicated by 76 so that the other arm 12 may engage upon the legs 73 and 74 when in the set position as clearly shown in FIG. 19.

A link 77 is pivotally looped around the junction between legs 73 and 74 and extends upwardly to be looped around the one leg 11 as at 78 and when the trap is in the set position, the other leg 12 is engaged between the lower part of the link 72 and portion 75 on one side with the link 77 upon the other side as clearly illustrated in FIG. 19. This applies pressure in the direction of arrow 79 due to spring 14. However, when in the set position, the upper end of link 72 is detachably engaged within the trigger engaging member 80. This trigger engaging member forms the lower leg of the trap retainer 71. This is a small angulated plate consisting of the trigger engaging portion 80 and a retain portion 81 extending at an acute angle from the rear edge of the portion 80. A screw 82 is welded to adjacent the junction of the portions 80 and 81 and extends rearwardly therefrom and may be screw threadably engaged within a supporting surface such as log 46 shown in FIG. 11 whereupon the trap may be suspended and balanced upon this retaining member 71 with the one leg 11 being engaged within the angle between portions 80 and 81 as clearly shown in FIG. 19.

The upper end of the trigger lever 72 is angulated outwardly as at 83 and a notch 84 is formed in one side edge of the trigger engaging member 80.

When set, the angulated end 83 is engaged within the notch and due to the pressure exerted by spring 14, engages the leading edge 85A of the notch as shown in FIG. 19 with the two legs applying pressure to the link 72 trying to move same in the direction of arrow 86.

With the loop hanging downwardly as in FIG. 18 and when in the set position, any movement of the loop forwardly or rearwardly will pivot the trap slightly thus causing the right angled portion 83 to move upwardly or downwardly in the direction of arrows 87 and 88 respectively, either movement of which will cause the end 83 to be disengaged from the notch and the legs to move rapidly towards the released or sprung position and with the lever 72 moving out of the way in the direction of arrow 86 so that the other leg 12 may clear the trigger assembly and move to the fully extended position. At the same time, it may and probably will disengage the trap from the retainer 71 but is retained by the check chain or cable 54A.

A safety loop 89 is provided and engages through the loop 78 of the link 77 and is pivoted freely therein. When it is desired to place the trap in a "safe" position, it is engaged over the upper end of the trigger lever 72 as clearly shown in FIG. 21 thus retaining the two legs substantially in the position shown in FIG. 18, but in a non-set relationship. Inasmuch as the safety link is slightly longer than the distance between the one arm and the leading edge 85A of the retainer, when in the set position, the trap can be tested.

It should be noted that the entire trigger assembly can be slid along the arms 11 and 12 depending upon the location of the trap upon the retainer 71. It should also be noted that the angulation of the portion 81 of the retainer prevents any upward movement of the one arm when the trap is set.

It should also be noted that the bifurcated leg arrangement 73 and 74 together with the centrally located link 77 gives a three-point suspension to the trigger assembly so that it does not move from side to side when in the set position.

Reference should be made to FIG. 22A in which the distal edge portion 80A of the trigger engaging member is angulated downwardly in order to align the portion of the trigger at 83, on a plane parallel with the portion of the arm 11 engaged within the member 71. 85A is substantially perpendicular to the centre of arm The preferred embodiment is shown in FIGS. 23 through 34 and similar reference characters have been given where applicable.

Certain of the views in this preferred embodiment are similar to those previously illustrated and described and once again similar reference characters have been given.

The two arms 11 and 12 connected by spring 14 are similar in construction with the exception that a stop 90 is formed on the distal end of arm 11. The trigger mechanism is similar to that hereinbefore described as is the trap retainer means 71 together with some additions hereinafter to be described.

It should be noted that an additional safety link 91 is provided having an elongated loop 92 on one end thereof freely engageable around arm 12 and a hook 93 on the other end thereof detachably engageable around arm 11 to hold the trap in a "safe" position while setting the trap.

The cable assembly collectively designated 94 is shown in FIG. 24 (mounted on the arm assembly) and in FIG. 31 in which it is shown separate from the arms.

It consists of a length of flexible cable 95 having a small loop 96 formed intermediate the ends of the length of cable. This loop 96 is freely slidable along the length of arm 11 upon which it is mounted, stop 90 preventing disengagement of the loop from arm 11.

An element 97 is secured to one end of the cable 95 and provides an adjustment for the other, smaller diameter, portion 95A of the cable secured to and extending from 97 and forming a loop 98 with a stop 99 being provided on the distal end of this other portion of the cable. An elongated bore 97A formed through the element 97 allows this portion of the cable to pass therethrough thus forming the loop and permitting a sliding adjustment for the size of the loops 98. This allows the trap to be set to catch animals of different sizes depending upon the animals present in the area and the thinner cable, although substantially equal in strength to the portion 95, does not damage the fur as killing is relatively rapid. It will be appreciated that, if desired, this loop may be fixed in element 97 with no adjustment being provided.

The outboard portion 100 of cable 95 extend beyond the clamp 101 and is provided with a further loop 102 on the distal end thereof formed by clamp 103. A cable pivot means 104 is provided and consists of a rigid link 105 having hooks 106 and 107 on either end thereof, with link 107 having an eye 108 incorporated therewith. The hooks 106 and 107 allow the pivot means 104 to be detachably secured adjacent the inner end of arm 11 and to the spring 14 thus providing a pivot for the cable length 100 which passes through eye 108 with the loop 102 being attached to a snap 109 which in turn is secured to a swivel 110 secured to the inner end of screw 51 below the flange 85 of the retainer 71.

In operation, the trap is mounted upon the retainer 71 as hereinbefore described for the previous embodiments. The trap is shown in the "set" position in FIG. 24 and, as previously described, movement of the loop 98 either forwardly or rearwardly relative to the vertical plane of the trap, will release the trigger mechanism provided the safety link 89 has been released, it being understood that link 91 is used only when setting the trap.

As the trap moves to the released position, the eye 18 at the end of arm 12 causes the loop 98 to close trapping the animal by the neck. It is important to note that the animal can only be caught by the neck.

As the arms move apart towards the released position, the cable loop 96 on the inner end of portion 100 slides down the arm 11 towards the stop ring 107 and note should be taken at this time of the bend or angulation at 12A in arm 12 adjacent the ring 18. This brings the angle of the cable on arm 11 to a position where it slides along towards the ring 107, readily and easily. This is the point of maximum pressure and assists in locking the cable against disengaging movement by the animal. In effect, the angulation at 12A provides a substantially straight line for the pressure on the arm 12 instead of the flexibility normally inherent therewith thus making it impossible for an animal to release the tension in the loop portion 98. In other words an animal can not "back out" of the loop as it is locked in. The angulated arm at 12A also provides greater leverage for the trigger mechanism inasmuch as less pressure is required to disengage the trigger when the trap is sprung.

Figure 32:
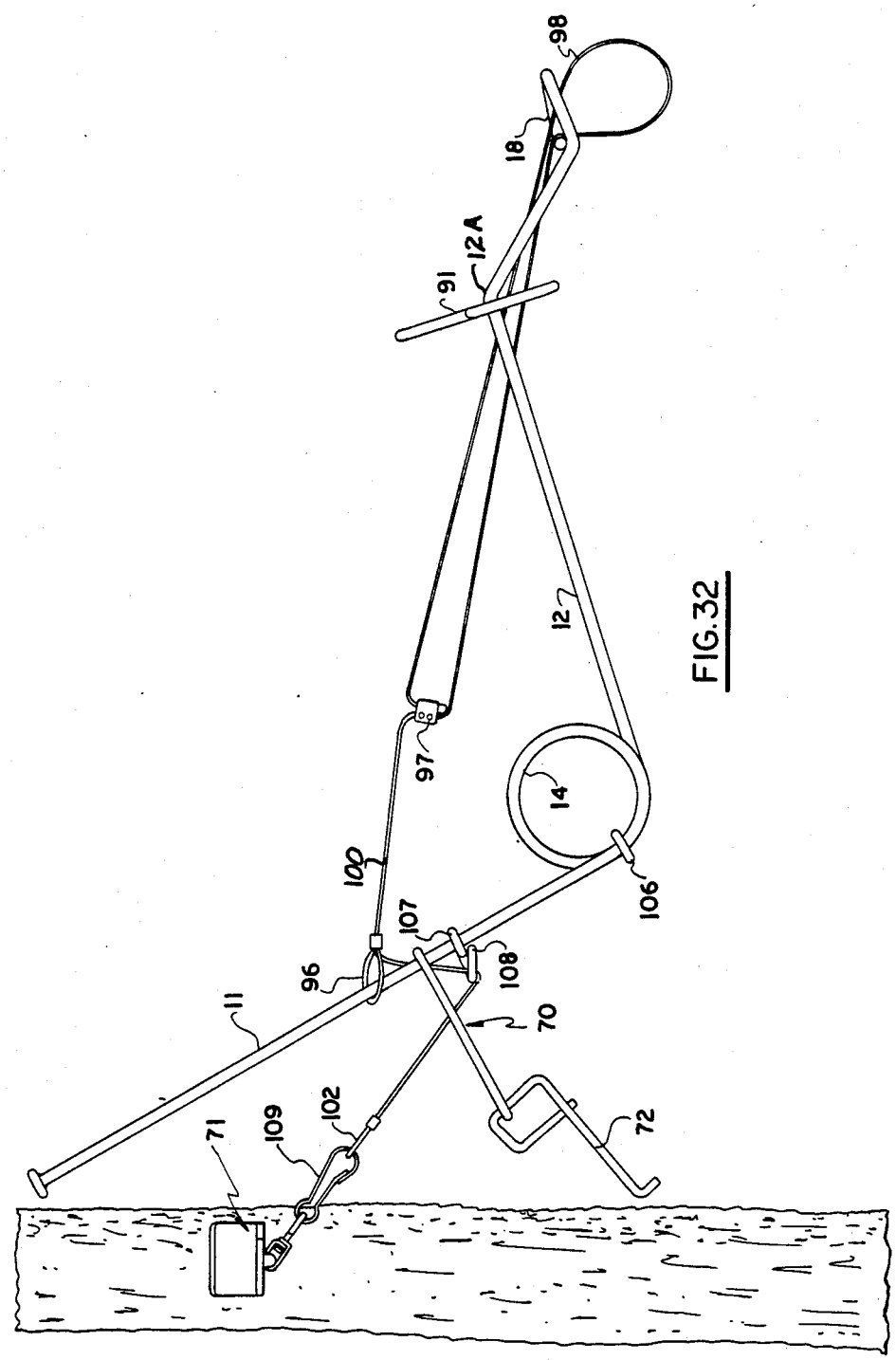
FIG. 32 is a side elevation of the trap shown in the sprung position.

The overall length of the cable when in the position shown in FIG. 32, and between loop 96 and 98 is such that if a small animal such as a fox is caught, the cable will automatically slide down to the stop 107 on arm 11 and the pressure of the reduced sized loop at 98 will kill the animal quickly and humanely, it being understood that the cable in effect pivots on loop 108.

If however a larger animal is caught such a coyote or wolf, the size of loop 98 will be larger and loop 96 will only slide part way along arm 11. However as the animal pulls on the cable in an effort to escape, the cable 100 will slide further through eye 108 thus forcing the loop 96 towards the stop 107. The greater the pressure the animal exerts on the cable, the greater the pressure it receives and maximum pressure is of course achieved when loop 96 reaches stop 107 at which point the cable becomes substantially straight line from the anchor 71 to the loop 98.

Figure 25:
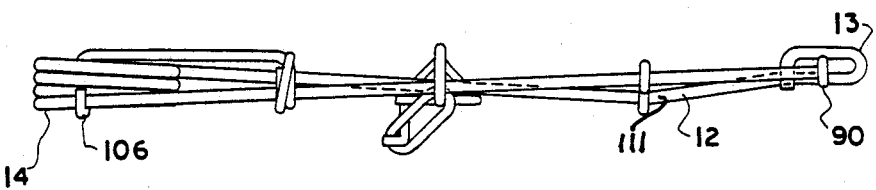
FIG. 25 is a top plan view of FIG. 23.
Figures 26, 33:
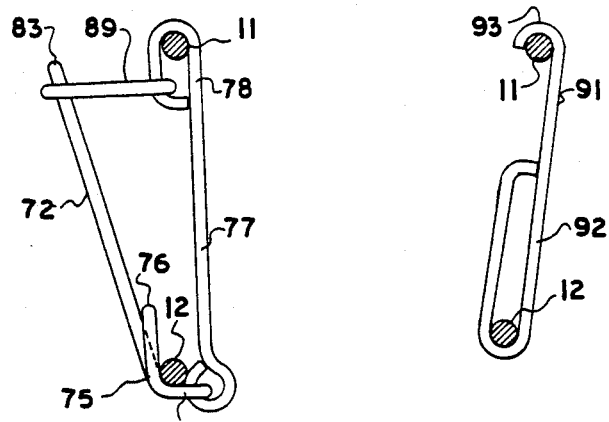
FIG. 26 is a cross sectional view along the line 26—26 of FIG. 23.
FIG. 33 is a cross sectional view substantially along the line 33—33 of FIG. 23.

Finally, reference should be made to FIG. 25 in which arm 12 is angulated transversely along the length thereof as at 111 (in a plane substantially perpendicular to the plane of the angulation at 12A) so that the distal ends of the arms, namely stop 90 and eye 13, are in the same vertical plane one above the other when the trap is in the set position and the spring 14 is also substantially vertical. The purpose of this particular offset is to allow positioning of the cable loop 98 when in the set position, to be in a substantially vertical plane thus facilitating the trigger release when it is swung in either direction from the vertical plane.

This gives a direct vertical pull upon the cable when the trap is released rather than the slightly sideways motion due to the width of spring 14, which occurs when this angulation is not present.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An animal trap comprising in combination a pair of elongated arms movable from a set position to a sprung or released position and vice versa, means at one end of said arms connecting same together and including spring means normally urging the distal ends of said arms away from one another, a flexible cable being connected by one end thereof, for sliding movement, along the length of one of said arms, a trapping loop on the other end of said cable, means on the distal end of the other of said arms slidably receiving said trapping loop of said cable and freely guiding same, cable pivot means on said one arm adjacent said spring means, trap retainer means for detachably supporting said trap by said one arm thereof, a flexible link extending from said one end of said flexible cable, freely passing through said cable pivot means and being secured to said trap retainer means, and trigger means operatively extending between said arms when in the set position, said one end of said cable means sliding along said one arm away from said one end thereof, when said trap is sprung thereby pulling said trapping loop through said means on the distal end of the other of said arms and rapidly decreasing the size of said sliding loop as the distal ends of said arms are moved apart by said spring means.

2. The trap according to claim 1 in which said trigger means includes a trigger engaging member engageable by one end thereof to said one arm and extending towards said other arm, a trigger element freely pivoted to said other arm and cooperatively and releasably engaging with said trigger engaging member, when in the set position.

3. An animal trap according to claim 2 in which said trigger element includes means pivotally mounting same to said other arm, and a trigger lever extending from said means for mounting said trigger element to said other arm, said trigger lever extending from said means towards said one arm and being detachably engageable within said trigger engaging member when said trigger means is in the set position, rotation of said trap around the horizontal longitudinal axis thereof in either direction, releasing said trigger lever from said trigger engaging means thereby releasing said trap from the set position towards said released position.

4. An animal trap according to claim 3 in which said means pivotally mounting said trigger element to said other arm includes an angulated bifurcated end portion formed on the lower end of said lever, said other arm engaging within the angle of said anulated end portion when in the set position, and a link pivotally secured by the lower end thereof to said angulated end portion and pivotally connected to said one arm whereby said other arm engages said anulated end portion between said lever and said link when in the set position.

5. An animal trap according to claim 2 in which said means pivotally mounting said trigger element to said other arm includes an angulated bifurcated end portion formed on the lower end of said lever, said other arm engaging within the angle of said angulated end portion when in the set position, and a link pivotally secured by the lower end thereof to said angulated end portion and pivotally connected to said one arm whereby said other arm engages said angulated end portion between said lever and said link when in the set position.

6. An animal trap according to claim 1 in which said trigger element includes means pivotally mounting same to said other arm, and a trigger lever extending from said means for mounting said trigger element to said other arm, said trigger lever extending from said means towards said one arm and being detachably engageable within said trigger engaging member when said trigger means is in the set position, rotation of said trap around the horizontal longitudinal axis thereof in either direction, releasing said trigger lever from said trigger engaging means thereby releasing said trap from the set position towards said released position.

7. An animal trap according to claim 6 in which said means pivotally mounting said trigger element to said other arm includes an angulated bifurcated end portion formed on the lower end of said lever, said other arm engaging within the angle of said angulated end portion when in the set position, and a link pivotally secured by the lower end thereof to said angulated end portion and pivotally connected to said one arm whereby said other arm engages said angulated end portion between said lever and said link when in the set position.

8. An animal trap according to claim 6 in which said trigger element includes means pivotally mounting same to said other arm, and a trigger lever extending from said means for mounting said trigger element to said other arm, said trigger lever extending from said means towards said one arm and being detachably engageable within said trigger engaging member when said trigger means is in the set position, rotation of said trap around the horizontal longitudinal axis thereof in either direction, releasing said trigger lever from said trigger engaging means thereby releasing said trap from the set position towards said released position.

9. An animal trap according to claim 8 in which said means pivotally mounting said trigger element to said other arm includes an angulated bifurcated end portion formed on the lower end of said lever, said other arm engaging within the angle of said angulated end portion when in the set position, and a link pivotally secured by the lower end thereof to said angulated end portion and pivotally connected to said one arm whereby said other arm engages said angulated and portion between said lower and said link when in the set position.

10. An animal trap according to claim 1 in which said means pivotally mounting said trigger element to said other arm includes an angulated bifurcated end portion formed on the lower end of said lever, said other arm engaging within the angle of said angulated end portion when in the set position, and a link pivotally secured by the lower end thereof to said angulated end portion and pivotally connected to said one arm whereby said other arm engages said angulated end portion between said lever and said link when in the set position.

11. An animal trap according to claim 10 which includes a safety link for said trigger means detachably securing said trigger lever in a safe position, said safety link engaging said trigger link at the pivotal connection thereof to said one arm and detachably engaging the distal end of said trigger lever.

12. An animal trap according to claim 11 which includes a detachable retainer for said trap, said retainer including an attaching position, means extending from said attaching portion detachably engageable within a supporting surface to support said retainer, a flexible link extending between said trap and said detachable retainer, and a trap support portion extending from the lower edge of said attaching portion at an acute angle therefrom, said one arm of said trap engaging upon said support portion and adjacent said attaching portion with said trap hung vertically therefrom when in the set portion.

13. An animal trap according to claim 10 which includes a detachable retainer for said trap, said retainer including an attaching portion, means extending from said attaching portion detachably engageable within a supporting surface to support said retainer, a flexible link extending between said trap and said detachable retainer, and a trap support portion extending from the lower edge of said attaching portion at an acute angle therefrom, said one arm of said trap engaging upon said support portion and adjacent said attaching portion with said trap hung vertically therefrom when in the set position, said attaching portion also constituting said trigger engaging member and having a notch formed on one side edge thereof, said trigger lever including a distal end portion extending substantially at right angles from the longitudinal axis of said trigger lever and engaging within said notch when said trap is in the set position.

14. An animal trap according to claim 10 in which one of said arms is angulated along the length thereof substantially horizontally relative to the movement of said arms whereby the distal ends of said arms are substantially in the same vertical plane when said spring means is substantially vertical and said loop hangs substantially vertical when said trap is in the set position.

15. An animal trap according to claim 1 which includes a detachable retainer for said trap, said retainer including an attaching portion, means extending from said attaching portion detachably engageable within a supporting surface to support said retainer, a flexible link extending between said trap and said detachable retainer, and a trap support portion extending from the lower edge of said attaching portion at an acute angle therefrom, said one arm of said trap engaging upon said support portion and adjacent said attaching portion with said trap hung vertically therefrom when in the set position.

16. An animal trap according to claim 15 in which one of said arms is angulated along the length thereof substantially horizontally relative to the movement of said arms whereby the distal ends of said arms are substantially in the same vertical plane when said spring means is substantially vertical and said loop hangs substantially vertical when said trap is in the set position.

17. An animal trap according to claim 16 in which said one arm is angulated along the length thereof in a plane substantially perpendicular to the plane of the substantially horizontal angulation of said arm therby increasing the alignment of said flexible cable between said trap retaining means and said trapping loop when said trap is sprung and substantially locking said trapping loop against disengagement thereof from the animal trap thereby.

18. An animal trap according to claim 1 in which one of said arms is angulated along the length thereof substantially horizontally relative to the movement of said arms whereby the distal ends of said arms are substantially in the same vertical plane when said spring means is substantially vertical and said loop hangs substantially vertical when said trap is in the set position.

19. An animal trap according to claim 1 in which said one arm is angulated along the length thereof downwardly and away from the longitudinal axis of said other arm thereby increasing the alignment of said flexible cable between said trap retaining means and said trapping loop when said trap is sprung and substantially locking said trapping loop against disengagement thereof from the animal trap thereby.

20. An animal trap according to claim 1 in which said cable pivot means on said one arm includes means securing one end thereof to said one arm, a rigid link extending along said one arm from said one end of said cable pivot means and a stop secured to the other end of said link and around said one arm, a pivot loop also formed in said other end of said link, said one end of said flexible cable engaging said stop when said trap is in the fully released position.

* * * * *